INVENTOR.
Takashi Tanigaki
et al

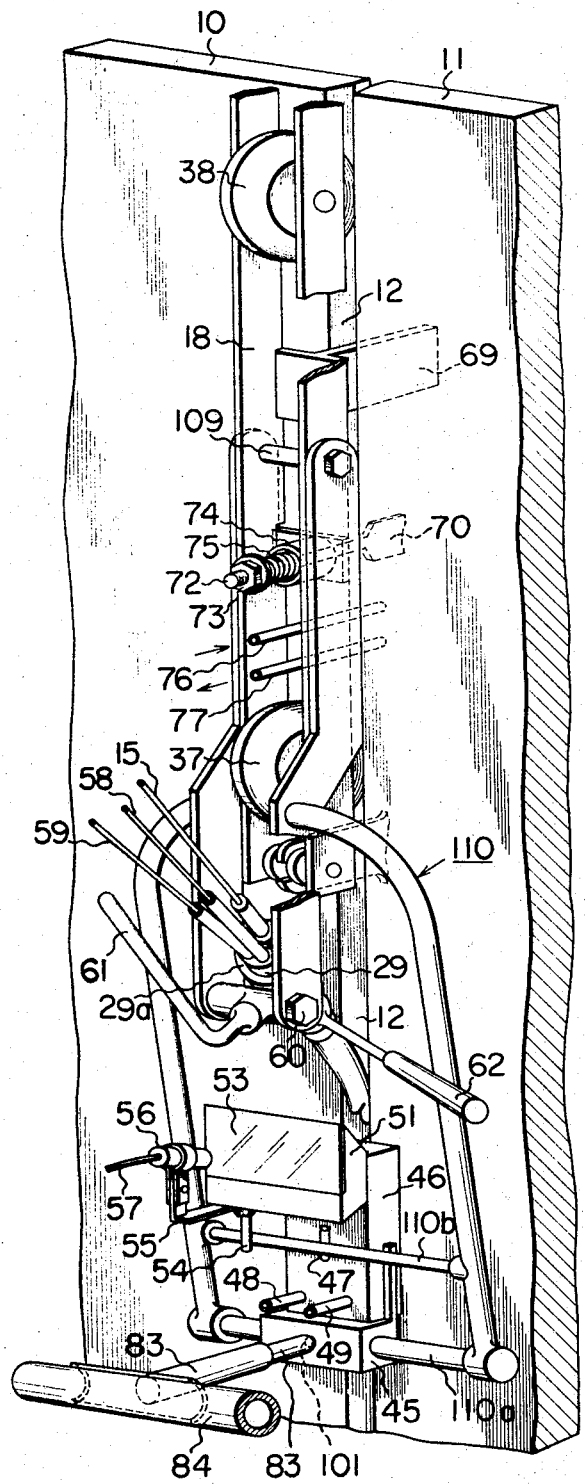
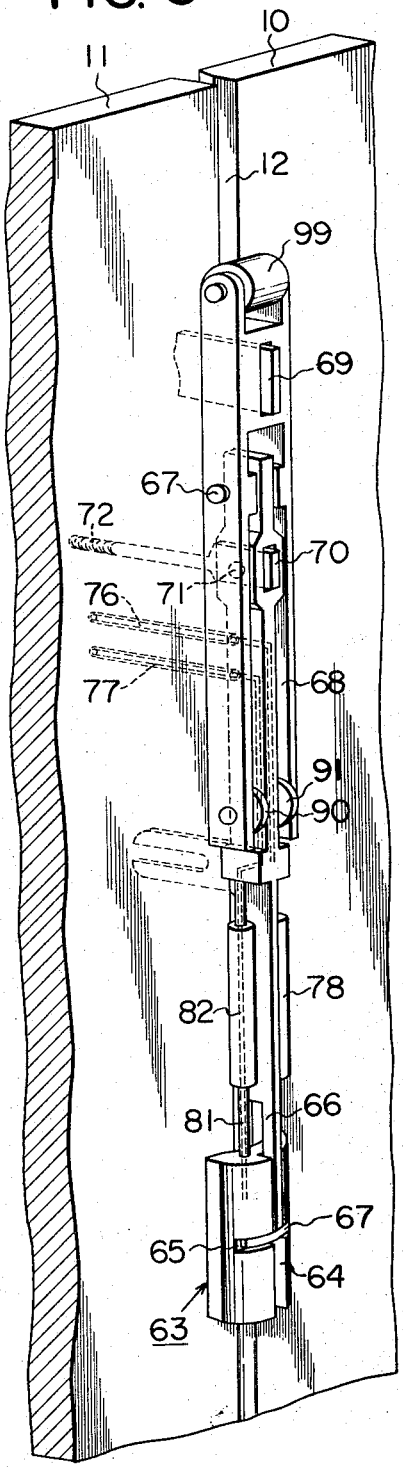
FIG. 2
FIG. 3

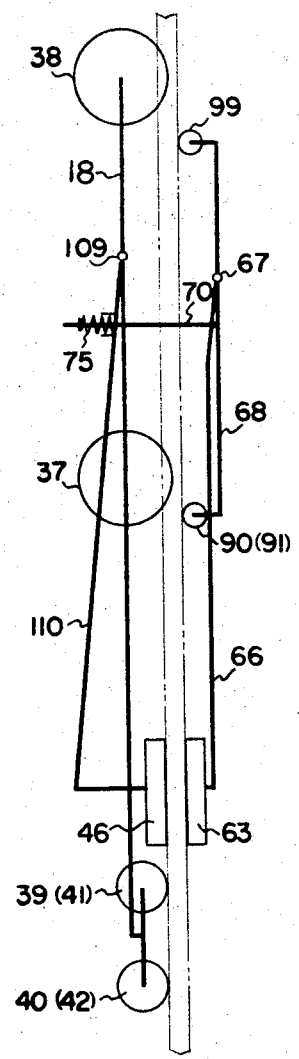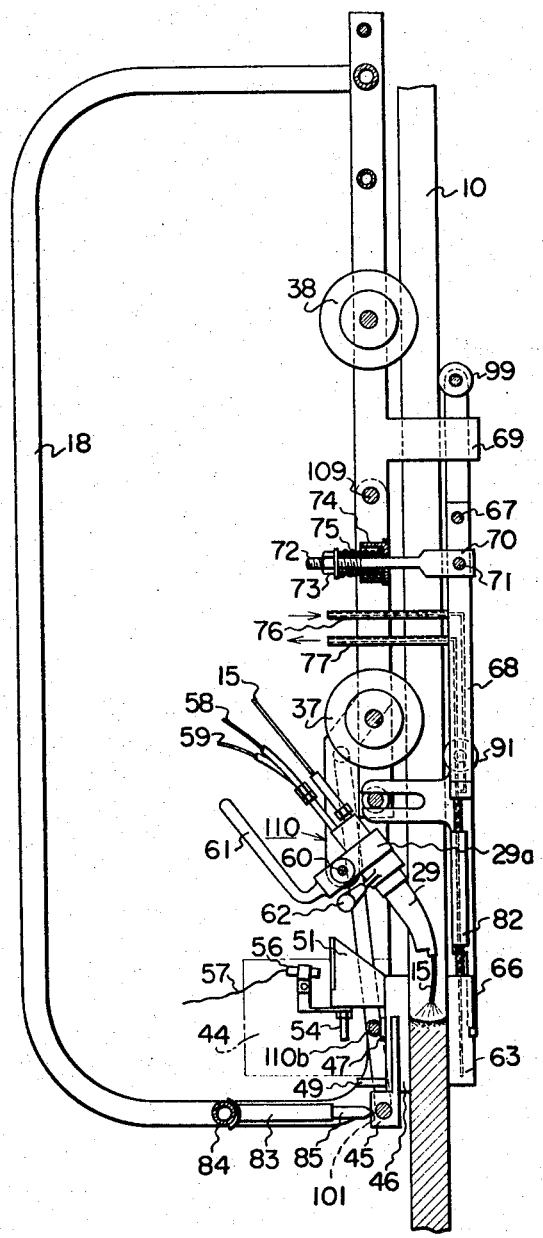

FIG. 10
FIG. 11
FIG. 13
FIG. 12
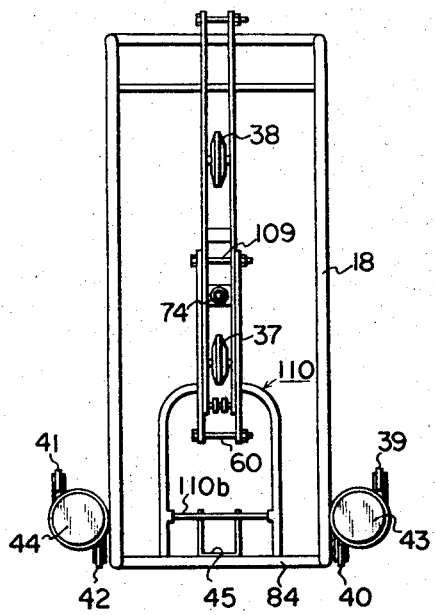
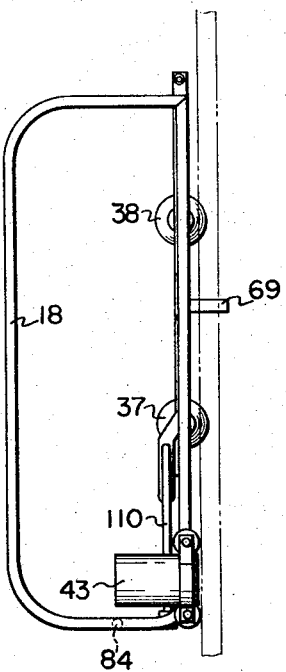
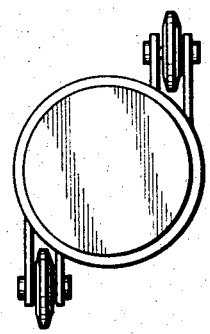
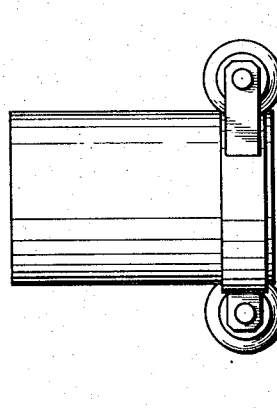

United States Patent Office 3,419,700
Patented Dec. 31, 1968

3,419,700
AUTOMATIC ELECTROGAS VERTICAL SEAM WELDING ARRANGEMENT
Takashi Tanigaki, Keiichi Ishimoto, and Katsumi Ishimoto, Yokosuka-shi, and Shimpei Iizuka, Yokohama-shi, Japan, assignors to Uraga Jukogyo Kabushiki Kaisha, Tokyo, Japan, a corporation of Japan
Filed Aug. 8, 1966, Ser. No. 570,882
Claims priority, application Japan, Aug. 7, 1965, 40/47,856; Oct. 2, 1965, 40/60,049; Nov. 5, 1965, 40/89,573
6 Claims. (Cl. 219—126)

This invention relates to improvements in and relating to a unique automatic electrogas welding arrangement adapted for carrying out the welding along long lengths of vertical welding gaps which are frequently required to be welded, for instance, in the building job of a huge ocean-going ship's hull.

In the past, substantially all of these jobs have been carried out with use of D.C. welding current with reliability and success. However, if it is desired to carry out similar jobs, under the utilization of A.C. welding current, considerable difficulties have been encountered from vigorous and unstable spattering of weld metal. This phenomenon results in a considerable accumulation of spatters in the close proximity of the supply opening for the protecting gas such as carbon dioxide, argon or similar gas, thereby the inlet gas passage in close proximity of the welding spot becoming smaller and smaller as the welding job proceeds and hemming the optimum and constant supply of the protecting gas to the welding spot.

Other difficulties have been encountered to keep at a substantially constant level the weld metal pool at the place of the welding process and during the whole progress of the welding. Therefore, for the realization of this to a substantially satisfying degree, frequent and delicate manual adjustments of various electric and mechanical elements must have been made, which naturally disturbed the practice of the desirous automatic welding procedure.

Still other difficulties have been encountered in keeping the chilling strips always in tight, yet slidable cooperation with the marginal zones along the vertical welding gap formed between the welding stocks, so as to enough preventing the weld metal pool from leaking out through small plays which are frequently formed between the chilling strips and the welding stocks on account of surface irregularities on and between the surfaces of the stocks.

It is therefore the main object of the present invention to provide a unique automatic electrogas welding arrangement adapted for use with formation of a vertical welding seam, and indeed, with use of A.C. welding current, yet having a highly simplified construction.

Starting from the conventional welding arrangement, comprising a carriage assembly movable along a vertical welding gap, a wire electrode feeder and a welding torch carried thereby, means for supplying a constant flow of protecting gas such as carbon dioxide to the welding spot and a pair of chilling strips carried by said carriage assembly and adapted for being kept in sliding and pressure contact with the welding stocks across the welding gap and at the both sides of said stocks, said arrangement being characterized by that one of said strips is formed rigidly with a protecting gas expansion chamber having a narrower inside opening and a wider outside opening, the former opening being positioned in close proximity of the welding spot and the latter opening being covered with a transparent sheet, thus forming a viewing window for allowing the observation of the welding sparks.

These and further objects, features and advantages can be easily understood from the following detailed description of a preferred embodiment of the present invention shown in the accompanying drawings for the illustration purpose only.

In the drawings.

FIG. 2 is an enlarged perspective view of the main and front part of the carriage assembly adopted in the arrangement shown in FIG. 1;

FIG. 3 is an enlarged perspective view of the auxiliary and rear part of the carriage assembly;

FIG. 4 is a side elevation of substantially a half of said carriage assembly, herein, however, several parts thereof are shown in section;

FIG. 5 is a schematic skelton representation for clear understanding of several main constituents of said carriage assembly with chilling strips;

FIGS. 10 and 11 are a front and an elevational view of main part of the carriage with attracting magnets; and FIGS. 12 and 13 are a front view and an elevational view of an attracting magnet assembly.

Now referring to the accompanying drawings, especially FIGS. 1–4 thereof, numerals 10 and 11 denote a pair of steel sheets to be welded together, which sheets are so arranged that they form a vertical welding gap 12 therebetween. These sheets 10–11 may constitute a part of a ship's hull under construction, for instance. It is intended to form a welding seam along the gap 12 with use of the automatic welding arrangement according to this invention as will become clear as the description proceeds.

Figure 1:
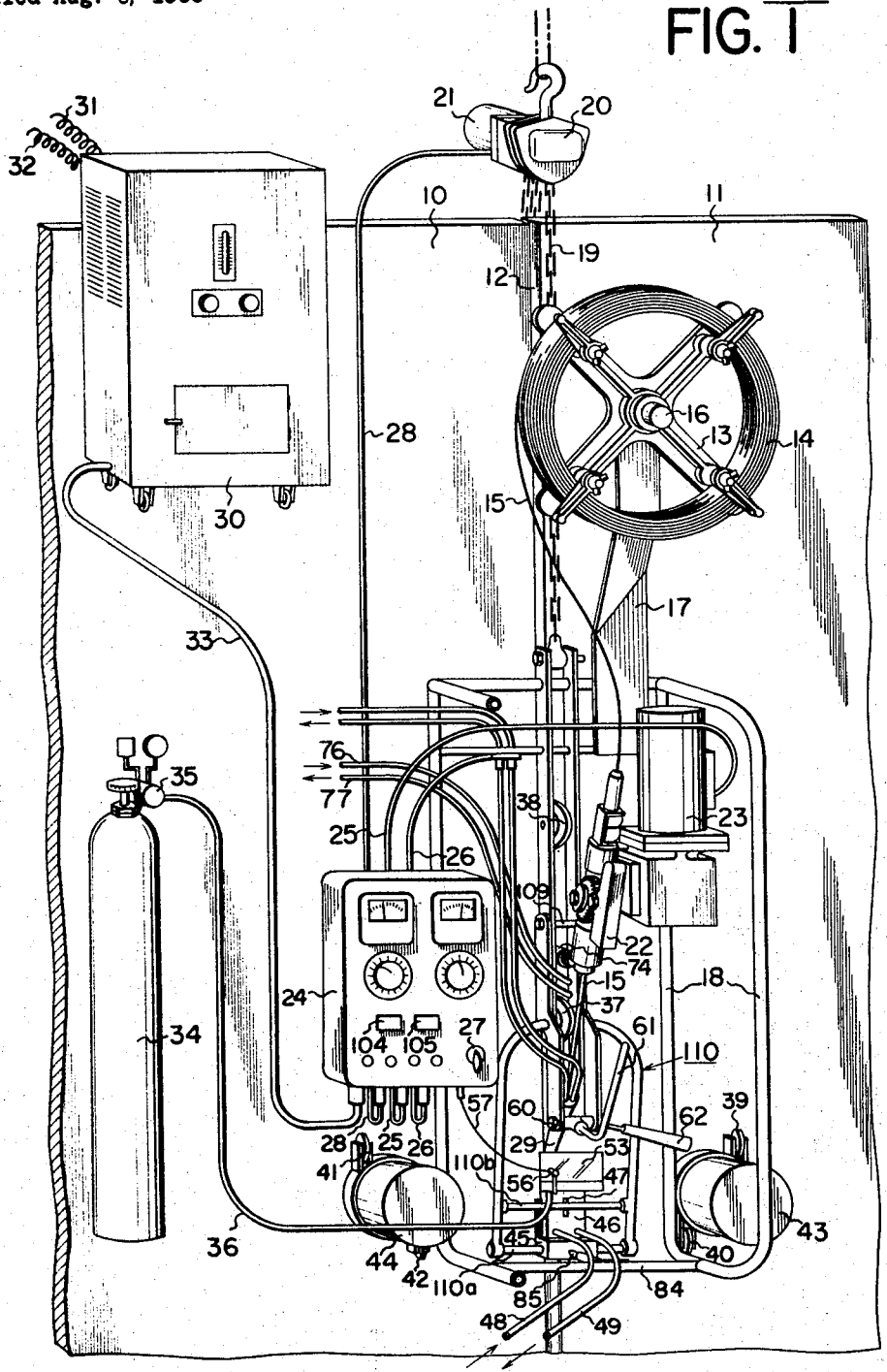
FIG. 1 is a schematic perspective view of the novel welding arrangement in combination with part of the welding stocks in proximity of a vertically arranged welding gap.
Figure 7:
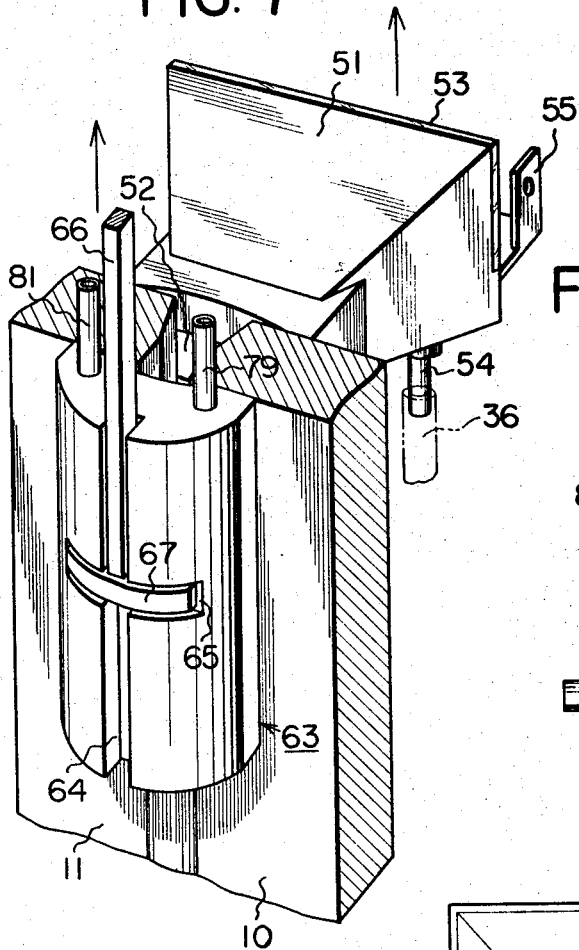
FIG. 7 is a perspective view thereof and the rear chilling strip, when seen from behind of the strip assembly.

13 denotes a rotatable carrier, formed in the shape of a wheel and carrying thereon a coil 14 of wire electrode 15, said wheel being rotatably mounted at 16 on a projecting support arm 17, extending upwards in FIG. 1 from a carriage proper 18 which is preferably shaped in a front main framework and suspended by means of a chain 19, from a conventional chain block 20 fitted with an electric motor 21, although the latter is shown only schematically in its outer configuration. The chain block 20 with motor 21 is further suspended from a crane boom or the like, although not shown.

22 denotes a conventional automatic feeder for the wire electrode 15 which feeder is mechanically coupled with feed motor 23, the feeder and motor being mounted on said carriage proper 18.

Figure 8:
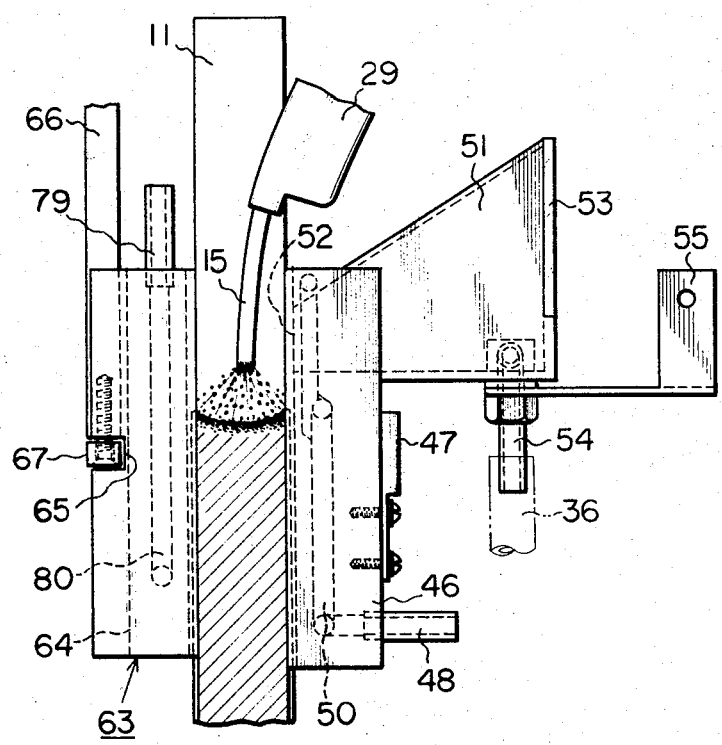
FIG. 8 is an elevational view of the strip assembly.

The current fed to feed motor 23 is conveyed through insulated conductors 25 and 26 extending from control box 24 which is mounted again on the carriage proper 18. Electric chord 28 is threaded between control box 24 and chain block motor 21 for controlling the power supply to the latter. The lower part of the wire electrode 15 extends from the automatic feeder 22 through a conventional torch 29 to the welding spot (see also FIGS. 2, 4 and 8).

The torch 29 is adjustably mounted on the carriage proper 18, as will be described more specifically with refeernce to FIG. 2.

30 denotes a welding transformer and normally mounted on the ground, although only schematically drawn in FIG. 1, as if it be in the air, for simplicity of the drawing. This transformer is connected through conductors 31 and 32 to a commercial power network, not shown. The secondary side of the transformer is electrically connected through insulated chord 33 to the control box 24.

34 denotes a gas container cylinder which contains therein pressurized protecting gas such as carbon dioxide which is delivered from the cylinder through a regulatable delivery valve 35 and delivery piping 36. Although the gas cylinder 34 is normally positioned on the ground, the drawing FIG. 1, has been drawn only schematically.

As most clearly seen from FIG. 2, the carriage proper 18 is provided with two guide rollers 37 and 38 which are adapted to roll along the welding gap 12. The carriage proper is further provided with an auxiliary frame 110 which is pivotably connected therewith at 109 and fitted with two pairs of supporting rollers 39, 40 and 41, 42 arranged to roll on the front surface of the welding stocks 10–11 at the both sides of the welding gap 12, for the purpose of keeping the carriage at a predetermined constant distance for instance several millimeters from the welding stocks. On the carriage proper, there is a pair of permanent magnets 43 and 44 fixedly mounted thereon, so as to magnetically urge the carriage towards the welding stocks 10–11. The whole design of front part of the carriage assembly can be most clearly seen from FIGS. 10–13.

Further referring especially to FIGS. 2–7, the auxiliary frame 110 of carriage proper 18 is formed with a cross bar 110a which constitutes the lowermost member of the carriage and formed rigidly with a mount 45 mounting in in turn detachably a front chilling strip 46 made preferably from copper. This strip 46 is pressed from behind against the welding stocks across the welding gap 12 by a second cross bar 110b formed integral with the auxiliary carriage frame through the intermediary of hinge projection 47 which is rigidly formed on the back surface of the slidable strip 46 substantially at its center when seen longitudinally as well as laterally. Therefore, this strip can swivel enough longitudinally as well as laterally so as to follow any possible undulations along the welding gap as the welding procedure proceeds, as will be later described more fully hereinafter.

The front strip 46 is formed therein with a cooling liquid canal 50, the ends of which are connected with an inlet piping 48 and an outlet piping 49, respectively, for better cooling of the strip, as conventionally.

Figure 9:
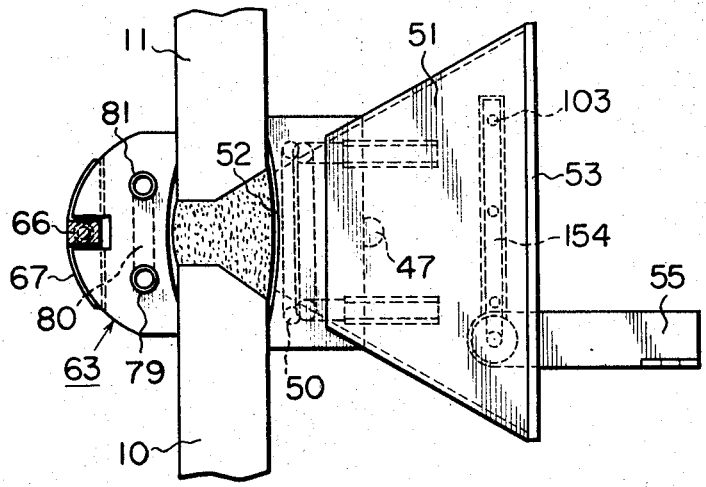
FIG. 9 is a top plan view thereof.

In the neighborhood of the top end, the front strip 46 is formed with a gas expansion chamber 51 which extends laterally and has a smallest cross-section at the innermost end 52 facing the welding spot and opened thereat for establishing a fluid communication between the interior space of the expansion chamber and the local space of the welding spot. For better understanding of this relationship, reference should be had especially to FIGS. 8–9.

The outermost end of this expansion chamber which has preferably a pyramidal shape as shown, is closed by a transparent cover such as protecting filter glass 53, so as to form a rectangular viewing window. The chamber 51 is provided with a depending gas inlet 54, to which the gas supply pipe 36, FIG. 1, is connected. The uppermost end of the inlet 54 extends to the interior of the expansion chamber 51 and connected with one end of a perforated gas distributor pipe 154 which is arranged rigidly on the bottom wall of the chamber 51 in close proximity to the cover glass 53.

The expansion chamber 51 is further provided fixedly with a support arm 55 which carries a photo-sensitive element 56, FIG. 2, comprising CdS, for instance, and arranged in close proximity of the viewing glass 53 so as to receive light beams issuing from the welding spot when the machine operates, and passing through the interior of the expansion chamber 51. Conductors 57 extend from the element 56 to a proper control element, not shown, in the control box 24, so as to control the winding-up speed of chain block motor 21, and thus the travelling speed of the carriage assembly along the welding gap 12.

The torch 29 is provided with conductors 58 and 59 for supplying welding current to the electrode 15, and having sheaths enclosing said conductors for conducting cooling liquid such as water thereabout.

In practice, the torch 29 is frictionally rotatably mounted at 60 and provided with a first adjusting lever 61 fixedly attached to the torch so as to adjust the latter about the pivot 60 and thus the tip end of the electrode 15 relative to the welding spot, as the welding condition may demand. In fact, the torch proper is frictionally embraced by a ring 29a which is adjustably mounted about the pivot 60 as above described. A second adjusting lever 62 is fixedly attached to the torch proper 29 so as to provide a possibility of adjustably rotating the latter relative to the embracing ring 29a, and thus to adjust the tip end of the electrode 15 substantially in the lateral direction relative to the first mentioned adjusting plane thereof.

The front slidable strip 46 is arranged to cooperate with a rear chilling strip 63 which is mounted so as to slide on the rear surfaces of welding stocks 10–11 in opposition to the first strip 46, and also across the welding gap 12.

Strip 63 is formed in its non-operating rear surface with a longitudinally extending guide groove 64 and a lateral groove 65 crossing therewith. The depth of longitudinal groove 64 is somewhat larger than that of the lateral groove 65. A puller bar 66 is received at its lower end portion by said longitudinal groove with considerable plays. A lateral bar 67 is pivotally mounted at 68 on the lower extremity of the longitudinal bar and received by the lateral groove 65 with considerable plays. The upper end of the pulling bar 66 is pivotably suspended at 67 by an auxiliary carriage 68 at its intermediate position between both extreme ends, which carriage is provided with a plurality of rollers 90, 91 and 99 adapted to keep a rolling contact with the rear surfaces of the welding stocks 10–11 substantially along the welding gap 12. The main carriage proper 18 is provided rigidly with a lateral arm 69 which supports in a hinge the auxiliary carriage 68. In this way, the unitary sliding movement of both carriages 18 and 68 along the welding gap and on the front and rear surfaces of the welding stocks can be positively assured. As most clearly seen from FIG. 4, a cross-bar 70 is hinged at its one end to the auxiliary carriage by means of pivot pin 71 having screw threads 72 which threadedly receives a nut 73. A spring holder 74 is rigidly attached to the cross-bar 70 at its intermediate point between the extreme ends and a compression spring 75 is positioned between the nut and the holder, so as to provide urging forces upon both carriage parts for resiliently keeping both chilling strips 46 and 63 in pressure contact with the welding stocks so as to sealingly cover the welding spot at both sides of the welding gap.

For effective cooling of the rear side chilling strip 63, cooling liquid supply pipe 76 is provided which is connected through a coupling hose 78 to inlet socket 79, which communicates cooling canal 80 formed in the chilling strip. Outlet socket 81 is connected through a coupling hose 82 which is in turn connected to cooling liquid discharge pipe 77.

Figures 4A, 4B:
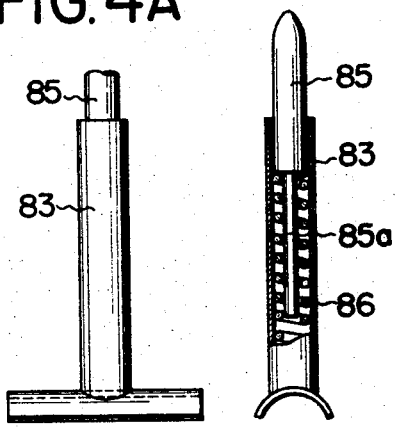
FIG. 4A is an enlarged top plan view of a lock means shown in the bottom part of FIG. 4.
FIG. 4B is a longitudinal section of the lock means shown in FIG. 4A.
Figure 6:
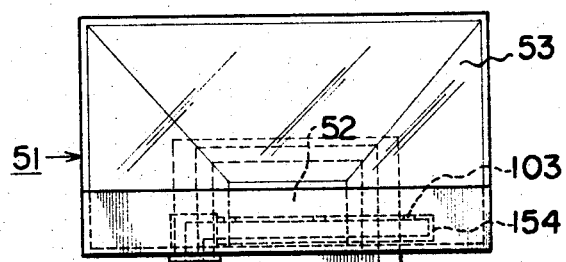
FIG. 6 is a front view of a gas expansion chamber fitted to the front chilling strip.
Figure 7A:
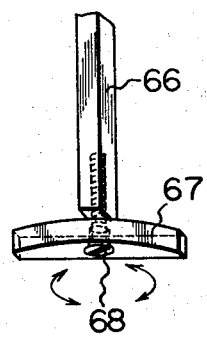
FIG. 7A is a perspective view of a compound hinge, allowing the rear strip to perfom three-dimensional pivotal movements.

As most clearly seen from FIGS. 4, 4A and 4B, a hollow sleeve 83 is pivotally mounted on a lateral bar 84 which is rigidly attached to the lowermost part of the front main carriage frame 18. A lock pin 85 is slidably received in the sleeve 83 and a coil spring 86 surrounds the reduced inner part at 85a, so that the pin 85, when in its operative or shown position, kept in pressure engagement with a recess 101 formed on the supporting mount 45 urges the front auxiliary frame 110 towards the welding stocks 10–11, thereby the front chilling strip 46 being urged resiliently against the welding spot.

The operation of the apparatus shown and described so far is as follows:

To initiating the welding operation, a cooling pump, not shown, is initially started so as to circulate cooling medium such as water to circulate both chilling strips 46 and 63, as well as the welding torch 29, as will be easily understood from the foregoing description of the arrangement according to this invention.

Next, delivery control valve 35 on the gas cylinder 34 is manually opened so as to supply the protecting gas at a constant rate from the cylinder or bottle through supply piping 36 to the inlet socket 54, thence to perforate distributor pipe 154.

The fed gas is delivered from the pipe 154 through a plurality of perforations 103 provided through the wall of the pipe into the interior space of the expansion chamber 51 and then forms a substantially non-turbulent, evenly expanded flow which is somewhat squeezed on account of the gradually reduced cross-section of the chamber. The thus shaped gas stream is led to pass through the end opening at 52 into the welding spot at which the lowermost end of the wire electrode 15 appears at a small distance from the lower end of torch 29.

Then, a switch 104 on the control box 24 is closed, thereby welding current being fed from welding transformer 30 through electric cable 33, control box 24 and conductors 58–59 to the torch 29 and thus to the wire electrode 15, thereby electric sparks being generated between the lower end of the electrode and the welding stocks which will become red-hot heated at the welding spot after several minutes.

As mentioned above, the expanded gas is squeezed to some degree by the surrounding inside wall surfaces towards and led out from the reduced supply opening 52 in an even outlet stream without risk of otherwise encountered formation of severe and strong swirls, into the welding space below the lowermost extremity of the wire electrode 15 as defined by the upper end portions of the opposing surfaces of chilling strips 46 and 63 and corresponding parts of the opposing end surfaces of the welding stocks 10–11.

In this case, the operator may observe the welding conditions within the welding space by viewing through the viewing window at 53. When the optimum operating conditions are realized by adjusting manipulating means on the control box 24, a further switch 105 on the control box is closed, so as to energize the feed motor 23 for the delivery of wire electrode 15 through the intermediary of feed gear at 22. At the same time, a manual switch 27 on the control box 24 is closed so as to supply drive current from proper current source through the control box and chord 28 to chain-block motor 21, thereby the latter acting to elevate through the intermediary of suspension chain 19 which may be fitted with a counter weight, not shown, the carriage assembly 18, 110, 68 and 64 with welding appliances including chilling strips 46 and 63 carried thereby, said carriage assembly being positively guided along the vertical welding gap at 12 by the rolling engagement of guide rollers 37–38 therewith. As the welding procedure progresses in this way and the wire electrode 15 consumes gradually, it will be delivered continously at a predetermined rate from the coil-wheel assembly 13–14 through feeding device 22 to the welding spot and thus, the welding operation will be continued along the welding gap.

When the operator desires to carry out a fine adjustment of the electrode end relative to the welding spot, he can do so in a two or three-dimensional manner by manipulating either or both of adjusting levers 61 and 62.

When the rolling speed of the carrier assembly is somewhat slower than the preset one, the welding sparks will become heavier correspondingly and the thus developed heavier light beams will pass through the interior space of the expansion chamber 51 and the viewing glass 53 and impinge upon the photo-sensitive element 56. This will cause to develop a considerably heavier current from the element, which current is then conveyed through conductor 57 to the interior of the control box and utilized to increase in a corresponding manner through the intermediary of a conventional current regulator, not shown, the drive current fed through conductor 28 to the chain-block motor 21, and vice versa.

There may be various and considerable undulations on the marginal areas in contact with the chilling strips and along the welding gap, and if there be no counter measure, weld metal will escape through small and variable gaps occasionally and frequently formed between the welding stocks, on the one hand, and the chilling strips, on the other hand. When there be a slight disalignment between the stocks 10 and 11 across the welding gap 12, the front chilling strip 46 can follow any surface irregularity caused thereby, by swiveling about pivot prejection 47 to a considerable degree. On the other hand, the rear side chilling strip 63 may swivel about the lower end of pulling bar 66 in a lateral direction, and/or about the cross-bar 67 in a longitudinal plane, although the degree of swiveling movement of the strip 63 will be limited to a certain small degree. Other surface irregularities can be met in the similar manner.

Of course it should be understood that there may be various different embodiments of the arrangement without departing from the scope of the present invention.

Having now particularly described and ascertained the nature of our said invention, and in what manner the same is to be performed, we declare that what we claim is:

1. In an automatic A.C. electrogas vertical seam welding arrangement comprising a carriage assembly adapted for moving along an elongated vertical gap formed between a pair of stocks to be welded together, a wire electrode feeder carried by said carriage assembly, a welding torch carried by said carriage assembly and adapted for receiving an elongated wire electrode from said feeder, means carried by said carriage assembly for supplying a constant flow of protecting gas such as carbon dioxide to a welding spot selected in proximity of said assembly and in said gap, and a pair of chilling strips carried by said assembly and adapted for being kept in sliding and pressure contact with said welding stocks across said welding gap and at both sides thereof, a combination of a gas expansion chamber formed integrally with one of said strips and having a narrower inside opening and a wider outside opening, a transparent cover sheet closing said outside opening, and means for connecting fluidically the interior of said chamber with said gas supply means, said inside opening being positioned in close proximity of said welding point, said chamber thereby forming a viewing window for allowing the observation of welding sparks at the welding spot, when the welding process goes on.

2. Welding arrangement as set forth in claim 1, characterized by that said expansion chamber formed into a horizontal pyramidal form.

3. Welding arrangement as set forth in claim 1, characterized by that said carriage assembly comprises a front part comprising in turn a main frame and an auxiliary frame hinged thereto, said main frame being provided with a pair of attracting permanent magnets carried thereby and one of said chilling strips being carried by said auxiliary frame.

4. Welding arrangement as set forth in claim 3, characterized by that said one of chilling strips is mounted on said auxiliary frame in a pivotable manner in any of three-dimensional directions.

5. Welding arrangement as set forth in claim 3, characterized by that said carriage assembly comprises further a rear part comprising in turn a separate frame connected hingedly to said main frame, said separate frame suspending a pulling rod assembly for the remaining one of said chilling strips.

6. Welding assembly as set forth in claim 5, characterized by that said pulling rod assembly allowing the remaining strip to pivot in any one of three-dimensional directions.

References Cited

UNITED STATES PATENTS

| 2,395,723 | 2/1946 | Chmielewski | 219—126 |
| 3,193,660 | 7/1965 | Colinet | 219—126 |
| 3,221,134 | 11/1965 | Agnew et al. | 219—126 |
| 3,235,705 | 2/1966 | Agnew et al. | 219—126 |
| 3,281,570 | 10/1966 | Wooding | 219—126 |
| 3,296,412 | 1/1967 | Waite et al. | 219—126 |
| 3,303,321 | 2/1967 | Harmsen et al. | 219—126 |

RICHARD M. WOOD, *Primary Examiner.*

W. D. BROOKS, *Assistant Examiner.*

U.S. Cl. X.R.

219—147